(12) United States Patent
Van Leeuwen et al.

(10) Patent No.: US 9,249,235 B2
(45) Date of Patent: Feb. 2, 2016

(54) PROCESSES FOR ISOLATING CHITIN AND CHITOSAN FROM FUNGAL BIOMASS

(71) Applicants: Johannes Van Leeuwen, Ames, IA (US); Glenn A. Norton, Ames, IA (US); Sipho C. Ndlela, Ames, IA (US); Daniel Rudnick, Bakersfield, CA (US)

(72) Inventors: Johannes Van Leeuwen, Ames, IA (US); Glenn A. Norton, Ames, IA (US); Sipho C. Ndlela, Ames, IA (US); Daniel Rudnick, Bakersfield, CA (US)

(73) Assignees: Johannes Van Leeuwen, Ames, IA (US); Daniel Rudnick, Bakersfield, CA (US)

( * ) Notice: Subject to any disclaimer, the term of this patent is extended or adjusted under 35 U.S.C. 154(b) by 0 days.

(21) Appl. No.: 14/212,137

(22) Filed: Mar. 14, 2014

(65) Prior Publication Data
US 2014/0275507 A1 Sep. 18, 2014

Related U.S. Application Data

(60) Provisional application No. 61/800,902, filed on Mar. 15, 2013.

(51) Int. Cl.
*C08B 37/08* (2006.01)
*C08B 37/00* (2006.01)

(52) U.S. Cl.
CPC ........... *C08B 37/003* (2013.01); *C08B 37/0003* (2013.01)

(58) Field of Classification Search
None
See application file for complete search history.

(56) References Cited

U.S. PATENT DOCUMENTS

| | | | |
|---|---|---|---|
| 4,282,351 A | 8/1981 | Muzzarelli | |
| 4,368,322 A | 1/1983 | Muzzarelli | |
| 6,693,188 B2 | 2/2004 | Bohlmann et al. | |
| 6,972,284 B2 | 12/2005 | Fan et al. | |
| 7,049,433 B2 | 5/2006 | Fan et al. | |
| 7,413,881 B2 | 8/2008 | Fan et al. | |
| 7,488,812 B2 | 2/2009 | Trinkle et al. | |
| 7,816,514 B2 | 10/2010 | Fosdick et al. | |
| 7,923,437 B2 | 4/2011 | Zhou et al. | |
| 8,034,925 B2 | 10/2011 | Fosdick et al. | |
| 8,222,232 B2 | 7/2012 | Anderson et al. | |
| 8,962,883 B2 | 2/2015 | Banner et al. | |
| 2005/0130273 A1* | 6/2005 | Versali et al. | 435/85 |
| 2012/0245336 A1* | 9/2012 | Daly et al. | 536/20 |
| 2012/0329135 A1 | 12/2012 | Lopez-Cervantes | |
| 2013/0331557 A1 | 12/2013 | Bristow | |
| 2014/0100361 A1 | 4/2014 | Le Roux et al. | |

OTHER PUBLICATIONS

NPi, Emission Estimation Technique Manual for Solvent Recycling, Jul. 1999.*

U.S. Department of Agriculture (USDA), "Mushrooms Profile", Ag Marketing Center, 2014, http://www.agmrc.org/commodities_products/specialty_crops/mushrooms-profile/.

Wu, Tao, "Production and Characterization of Fungal Chitin and Chitosan", Master's Thesis, 2004 http://trace.tennessee.edu/cgi/viewcontent.cgi?article=3679&context=utk_gradthes, University of Tennessee, Knoxville, Graduate School at Trace.

Reddy, M.V. Bhaskara; Arul, Joseph; Angers, Paul and Couture, Luc; "Chitosan Treatment of Wheat Seeds Induces Resistance to Fusarium graminearum and Improved Seed Quality"; J. Agr. Food Chem.; American Chemical Society; 1999; 47; pp. 1208-1216.

Wan, Jinrong, Zhang, Xue-Cheng, and Stacey, Gary; "Chitin Signaling and Plant Disease Resistance"; Plant Signaling & Behavior 3:10; pp. 831-833; Oct. 2008; Landes Bioscience.

Roller, S. and Covill, N.; "The Antifungal Properties of Chitosan in Laboratory Media and Apple Juice"; International Journal of Food Microbiolgy; 1999; 47; pp. 67-77; Elsevier Science Ltd.

Zivanovic, S., Basturto, C.C., Chi, S., Davidson, P.M., and Weiss, J.; "Molecular Weight and Concentration of Chitosan Influences its Antimicrobial Activity in Oil-in-Water Emulsions"; Journal of Food Protection; 2004; vol. 67 No. 5; pp. 952-959.

Garcia Mendoza, C., Avellan, M. A., Sanchez, E.; Novaes-Ledieu, M; Differentiation and Wall Chemistry of Agaricus Bisporus Vegetative and Aggregated Micelia; Arch Microbiol; 1987; vol. 148; pp. 68-71.

White, Stephen. A., Farina, Peter. R., and Fulton, I.; "Production and Isolation of Chitosan from Mucor rouxii"; Applied and Environmental Microbiology; 1979; vol. 38 No. (2); pp. 323-328.

Streit, Fernanda, Koch, Fernanda, Laranjeira, Mauro C.M., and Ninow, Jorge L.; "Production of Fungal Chitosan in Liquid Cultivation Using Apple Pomace as Substrate"; Brazilian Journal of Microbiology; 2009; vol. 40; pp. 20-25; ISSN 1517-8382.

Brown, D.E., and Thornton, A.J.; "Chitinous Material in Trichoderma reesei"; Biotechnology Letters; Chapman & Hall; Aug. 1998; vol. 20 No. 8, pp. 777-779.

Nwe, Nitar, Furuike, Tetsuya, and Tamura, Hiroshi; "Production and Application of Cell Wall Compounds Chitin and Chitosan"; Adv Polym Sci; Springer-Verlag Berlin Heidelberg; 2011; vol. 244; pp. 187-208.

Suntornsuk, W., Pochanavanich, P., Suntornsuk, L; "Fungal Chitosan Production on Food Processing Byproducts"; Process Biochemistry; 2002; vol. 37; pp. 727-729; Elsevier Science Ltd.

(Continued)

*Primary Examiner* — Layla Bland
(74) *Attorney, Agent, or Firm* — Coleman & Horowitt, LLP; Sherrie M. Flynn

(57) ABSTRACT

Methods of extracting chitin and chitosan from fungal biomass using a solution of one or more ammonia compounds, amines, and/or alkaline silicate compounds. The solution dissolves and extracts amino acids, fatty acids and other carbohydrates from the fungal cells leaving chitin and/or chitosan, and the extractant may be recovered from the liquid by simple phase changes such as heating or cooling, dissociation into volatile components, distillation and/or solidification and separation of immiscible extractants. Further lipid removal may be achieved with one or more organic solvents, which may also be recovered by distillation.

25 Claims, 5 Drawing Sheets

(56) References Cited

OTHER PUBLICATIONS

Ospina Álvarez, Sandra Patricia, Ramírez Cadavid, David Alexander, Escobar Sierra, Diana Marcela, Ossa Orozco, Claudia Patricia, Rojas Vahos, Diego Fernando, Zapata Ocampo, Paola, and Atehortúa, Lucia; "Comparison of Extraction Methods of Chitin from Ganoderma lucidum Mushroom Obtained in Submerged Culture"; BioMed Research International; vol. 2014, Article ID 169071; http://dx.doi.org/10.1155/2014/169071.

Synowiecki, Jozef, and Al-Khateeb, Nadia Ali Abdul Quawi; "Mycelia of Mucor rouxii as a Source of Chitin and Chitosan"; Food Chemistry; 1997; vol. 60 No. 4; pp. 605-610; Elsevier Science Ltd.

Struszczyk, Marcin H.; "Chitin and Chitosan"; Polimery 2002, vol. 47, nr 5; pp. 316-325.

Hang, Y. D.; "Chitosan Production from Rhizopus oryzae mycelia"; Biotechnology Letters; 1990, vol. 12, No. 12; pp. 911-912.

Dhillon, Gurpreet Singh, Kaur, Surinder, Brar, Satinder Kaur, and Verma, Mausam; "Green Synthesis Approach: Extraction of Chitosan from Fungus Mycelia"; Critical Reviews in Biotechnology; 2013; vol. 33 No. 4; pp. 379-403; ISSN 0738-8551; Informa Healthcare USA, Inc.

Kumar, Acharya B. Vishu, Gawda, Lalitha R., and Tharanathan, Rudrapatnam N.; "Non-Specific Depolymerization of Chitosan by Pronase and Characterization of the Resultant Products"; Eur. J. Biochem.; vol. 271; pp. 713-723; FEBS.

* cited by examiner

| Ammonium Compounds | Amine Compounds |
|---|---|
| Ammonium Acetate | Aniline |
| Ammonium Azide | Ethanolamine |
| Ammonium Benzoate | Ethylamine (including di- and tri-ethyl) |
| Ammonium Calcium Phosphate | Ethylenediamine |
| Ammonium Carbamate | Hydroxylamine |
| Ammonium Carbonate | Imidazole |
| Ammonium Bicarbonate | Methoxypropylamine |
| Ammonium Chloride | Methylamine (including di- and tri-methyl) |
| Ammonium Citrate | Phenylamine (including di- and tri-phenyl) |
| Ammonium Formate | Piperidine |
| Ammonium Hydroxide | Propylamines |
| Ammonium Iron (III) Chloride | Pyridine |
| Ammonium Lactate | Pyrrole |
| Ammonium Magnesium Carbonate | Quinoline |
| Ammonium Oxalate | |
| Ammonium Oxalate, Ferric | Silicate Compounds |
| Ammonium Phosphate | Sodium metasilicate |
| Ammonium Picrate | Sodium orthosilicate |
| Ammonium Propionate | Sodium silicate $[Na_2(SiO_2)_nO]$ |
| Ammonium Sodium Phosphate | Potassium disilicate and hydrogen disilicate |
| Ammonium Succinate | Potassium metasilicate |
| Ammonium Tartrate | Potassium tetrasilicate |

FIG. 4

PROCESSES FOR ISOLATING CHITIN AND CHITOSAN FROM FUNGAL BIOMASS

CROSS-REFERENCE TO RELATED APPLICATIONS

This application claims priority to U.S. Provisional Patent Application No. 61/800,902 filed Mar. 15, 2013, entitled "Processes for Isolating Chitin, Protein and Oil from Fungal Biomass", and is hereby incorporated by reference in its entirety.

FIELD OF INVENTION

The present invention generally relates to the field of producing chitin. More specifically, embodiments of the present invention relate to methods for obtaining chitin and other beneficial commodities from fungal biomass.

DISCUSSION OF THE BACKGROUND

Chitin is a valuable substance found in the animal and fungi kingdoms. It is the main component of the cell walls of fungi, the exoskeletons of insects and arthropods (e.g., crabs, lobsters, shrimp, etc.), the radulae of mollusks, and the beaks and internal shells of cephalopods (e.g., squid, octopuses, etc.). Chitin is useful for many medical and industrial purposes. Chitosan is a deacetylated form of chitin which occurs naturally along with chitin in different proportions in various fungal cells. Both chitin and chitosan can serve as raw material for making forms of glucosamine, nutraceuticals for which there is a huge demand.

Glucosamine is considered by many to provide significant therapeutic relief for arthritis and joint pain. Glucosamine may also aid the restoration of cartilage to relieve inflammation in the joints, and is beneficial to both animals and humans. In the Unites States, glucosamine is sold as a dietary supplement for humans, and is prescribed as a supplement for pets. Market size worldwide may be a million tons per year, with a retail value of tens of billions of dollars.

Currently, the main source of commercial glucosamine is crustaceans. The exoskeletons of these organisms are processed to obtain the natural polymer chitin, which is converted into its monomer glucosamine using acid and alkaline production techniques. Chitosan is made by alkaline deacetylation of chitin. These sources provide useful glucosamine for most applications. However, there are a number of limitations on the production and use of these crustacean-based products.

First, the extraction processes employed to convert glucosamine from crustacean chitin produces waste streams have significant environmental impacts. In addition, because many species of crustaceans are involved, the often wild-harvested crustaceans exhibit substantial variations in exoskeleton composition, as the feeds they scavenge on vary extensively. Further, because various toxicants are released in the shallow waters in which the crustaceans live, products derived from these crustaceans may contain significant concentrations of industrial contaminants, including heavy metals. Glucosamine derived from crustaceans is known to contain human allergens that can be dangerous to allergic individuals, which comprise approximately 2% of all adults. The seasonality of harvesting also complicates the steady production of glucosamine.

Moreover, the act of harvesting of crustaceans has significant environmental impacts. The crustaceans are part of the food chain and the harvesting process has detrimental effects on other sea life such as plants and corals.

Some religions also object to ingesting glucosamine derived from crustaceans. Both strict Muslims and Jews reject crustaceans as not being "halal" or "kosher". Likewise, many Hindus and vegans require glucosamine that is free of products derived from animals, and glucosamine compositions derived from shellfish do not meet these needs. Thus, production of glucosamine from sources other than crustaceans, e.g. derived from fungal biomass, is desirable.

Conventional methods of producing chitin from fungal biomass require a deproteinization step to isolate the chitin. Traditional deproteinization procedures utilize a strong alkali, most typically 10% sodium hydroxide solutions, to produce a mixture of amino acids, saponified fatty acids (lipids) and alkali in water. The problem is that there is no simple way to extract the protein, fatty acids and other components, and particularly to recover the alkali from the biomass. Additionally, to improve the purity of the resultant chitin, washing with water is required, thereby exacerbating the complexity of alkaline extraction and recovery from larger volumes of water, or otherwise creating a waste disposal problem.

Furthermore, after the alkaline extraction utilizing conventional methods, the remaining solids are extracted with an alcohol (typically methanol) to remove any residual lipids. The solids are then washed, dewatered, and dried. The extraction process produces a voluminous chitin-rich hydrogel from the fungal biomass. After drying the hydrogel, the volume decreases dramatically and leaves solid chitin. However, depending on the alkaline chemical and processing conditions, the physical nature of the dried chitin can vary greatly. For example, the dried chitin can be in the form of a "chip" or sheet that is either wavy or flat and can be picked up as a single piece. In other cases, a chip or sheet is not produced at all, but instead the chitin remains attached as a coating to the drying equipment and must be scraped out, thereby requiring additional labor, or a different drying method such as spray drying, adding to the cost of the chitin production.

As described in the conventional methods above, isolating chitin from fungal biomass by extracting proteins and oil with a sodium hydroxide solution is effective, but creates messy extracts that make recovery of protein, oil, alkali, and other components difficult.

Therefore, there is a need for an economical method that produces safe, non-animal, high-quality chitin and chitosan for use as the raw material for the production of glucosamine that does not offend religious convictions or exclude users with certain allergies. Furthermore, there is a need for a method that produces chitin or chitosan of consistent quality with minimal environmental impact.

SUMMARY OF THE INVENTION

The present invention relates to economical methods for producing consistent, high-quality chitin and chitosan from a microbial fungal biomass using simple extraction processes having minimal environmental impacts. Suitable starting materials include fungal biomass derived from a variety of molds, particularly those in the fungal phylum Zygomycota such as *Rhizopus* sp. and *Mucor* sp., the phylum Basidiomycota such as *Phanerochaete* sp. and *Gleophyllum* sp., and the phylum Ascomycota such as *Aspergillus* sp. and *Trichoderma* sp., or any combinations thereof. These species are just examples and most fungi would be suitable for chitin and chitosan production, with some species having a higher yield than most. The invention also represents a cleaner, greener technology that is not as environmentally disturbing as the current production methods.

Fungal cells can be broken down and separated into three main components, specifically, protein, oil and chitin or chitosan by using solutions of ammonium compounds, amines, and silicate compounds either alone or in various combinations with one another. The solution dissolves and extracts amino acids, fatty acids and other carbohydrates from the fungal cells leaving chitin. The extractant can easily be recovered from the liquid by various simple phase changes. For example, ammonium hydroxide can be evaporated as ammonia and water, and then condensed to reusable ammonium hydroxide. Extractants such as an ethanolamine solution can be recovered by freezing and screening out the solid ethanolamine. More volatile extractants, such as isopropylamine, can be recovered by distillation. Extractants that are not miscible with water can be separated by gravity or centrifugation. If a secondary extraction process is required for further lipid removal, this can be done with an organic solvent, usually methanol or ethanol, which may also be recovered from the extract by evaporation.

The present invention advantageously produces chitin or chitosan from a fungal biomass, resulting in material that can be used to produce high-quality glucosamine compositions that are generally uniform with low levels of impurities. The glucosamine compositions produced from such chitin or chitosan normally have relatively low ash content and are substantially free of heavy metal contaminants, which are often toxic. Furthermore, producing chitin or chitosan from fungal biomasses allows for production of glucosamine compositions that are free of shellfish allergens and which do not offend certain religious convictions, particularly those which forbid the consumption of shellfish. The chitin/chitosan produced and the glucosamine derived therefrom also do not constitute an animal product, and therefore are suitable for vegetarian use and avoid religious restrictions.

These and other advantages of the present invention will become readily apparent from the detailed description of the various embodiments below.

BRIEF DESCRIPTION OF THE DRAWINGS

FIG. 4 is a table listing examples of ammonium, amine, and silicate compounds that may be used for deproteinization of fungal biomass according to embodiments of the present invention.

DETAILED DESCRIPTION

Figure 1:
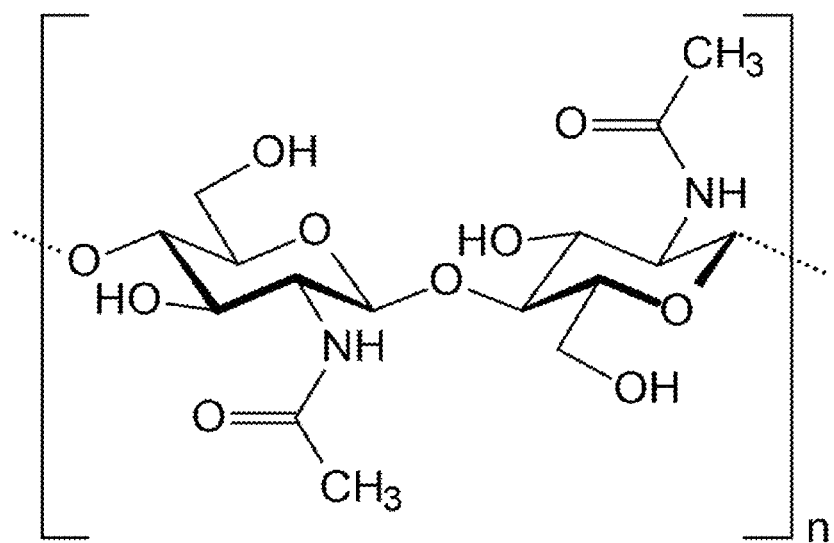
FIG. 1 shows the structure of the monomer N-acetylglucosamine, one of the repetitive building blocks of the chitin polymer.
Figure 2:
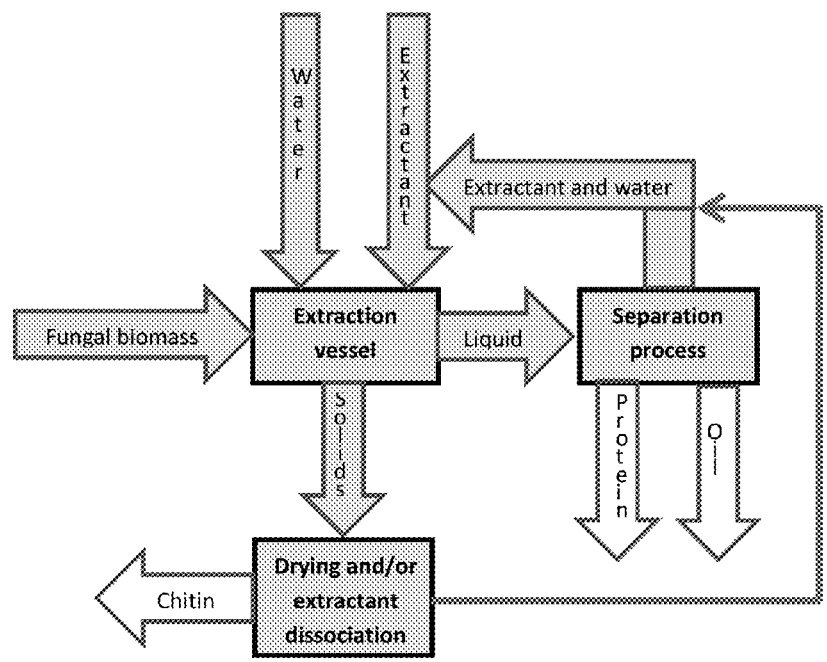
FIG. 2 is a schematic showing the essential generic components of the process for separating chitin/chitosan from fungal biomass according to embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

The invention results in the production of the valuable biopolymer chitin and/or chitosan from fungal cells. Chitin and chitosan are found in the cell walls of fungi but occur along with larger quantities of protein, lipids, and other carbohydrates. The invention separates chitin and chitosan from the protein and lipids. A secondary benefit is recovery of the protein for application in animal feed and the oil for use either as a fuel or animal feed supplement. A third benefit of the invention is the use of chemicals for extraction that are easily recoverable and/or do not create a disposal problem, representing a cleaner, environmentally-sustainable technology than the current state of the art.

Chitin is normally obtained from either animal origin, such as crustacean exoskeletons, and to a much smaller extent from fungi. The separation is normally accomplished by dissolving protein, and in the case of exoskeletons, dissolving the calcium carbonate in strong acids. The protein, which consists of amino acids, can be dissolved at either low or high pH.

The present invention utilizes a high-pH protein extraction, which may be coupled with the formation of soluble complexes. One or more recyclable substances, such as dissolved ammonia (e.g. ammonia hydroxide), amines (organic derivatives of ammonia) and alkaline silicate compounds may be used. Examples of such compounds are listed in Table 1. The compounds listed are all useful alone or in combination with one or more of the other listed compounds, but the list is not exhaustive as other similar compounds may be utilized in various embodiments of the invention.

Operating Ranges

In various embodiments the methods utilize one or more of the compounds listed in Table 1 and similar inorganic and organic compounds as extractants in formulating solvents in water solutions or admixtures. Various operating conditions are important to achieve the desired results.

Extraction Temperatures

Higher temperatures generally increase the extraction rate. While any temperature could be considered, the upper temperature for extraction may be limited to temperatures that do not denature the proteins. Also, some of the extractants become unstable and dissociate at higher temperatures. Consequently, a temperature lower than about 150° C. may be used, with a temperature lower than 100° C. being preferred. Typically extraction temperatures may be from 0° C. to 150° C. In preferred embodiments, the temperature range is between 0° C. and 100° C., or any value or range of values therein.

Extraction Pressures

Higher pressures enable the process to operate at higher temperatures. Some of the organic bases are more volatile than water, and water also sets a limit of about 100° C., unless the water is under a pressure greater than atmospheric pressure. As the upper temperature may be limited to about 150°

C., the pressure may be limited to 475 kPa absolute, or a gauge pressure of about 55 psi. When using volatile or dissociating extractants, such as ammonium hydroxide, pressures of up to 700 kPa absolute or a gauge pressure of up to 90 psi may be required. In preferred embodiments, the extraction pressures vary between ambient (about 100 kPa) and 475 kPa absolute, or any value or range of values therein.

Concentrations of Extractants

Embodiments may include all concentrations of extractants in water or organic solvents. However, extractant concentrations may be limited by their solubilities in the solvent, but many are fully miscible or largely miscible in water. Some organic bases may work best with no water. In preferred embodiments, the extractant concentration relative to water or an organic solvent may range from 1-100% or any value therein. In addition, some organic solvents immiscible with water may be effective with suitable agitation. In preferred embodiments, the extraction process may include two solvents that are immiscible with one another.

Ratio of Extractants to Fungal Biomass

The complete extraction of proteins may require a substantial volume of extractant solution. In preferred embodiments, the ratio of volume of extractant to damp (e.g., 50-90% water) fungal biomass may be between 1:1 and 100:1, inclusive, or any ratio therein, wherein the extractant may be in neat (undiluted) form, dissolved in water or an organic solvent, or mixed with water or organic solvents that are not miscible with one another.

Required Contact Times

The typical retention time is a number of hours depending on concentration and temperature. In preferred embodiments the contact time is between 1 and 72 hours, inclusive, depending on the extractant and the processing conditions such as the temperature and extractant concentration.

Recovery of Extractants

Extractants such as ammonium hydroxide may be recovered by heating, capturing and cooling to reconstitute the solvent for reuse. The physical properties of some amines lend themselves to such simple recovery.

In embodiments using volatile extractants such as isopropylamine (boiling point of 33° C.) and methylamine (boiling point of −6° C.), the extractants may be recovered by evaporation and condensation, and subsequently reused. Amines with high vapor pressures may also easily be recovered through simple air stripping and condensation. Similarly, dipropylamine (boiling point of 110° C.), which has an intermediate boiling point temperature, can be recovered by evaporation and condensation. Dipropylamine is not miscible in water, and therefore may also be recovered by gravity separation or centrifugation in embodiments where dipropylamine is mixed with water. Extractants with a freezing point slightly higher than water, such as ethanolamine (freezing point of 10° C.), may be recovered by cooling the liquids to a temperature below its freezing point and recovering the solid extractant by screening. Freezing and boiling points for silicate compounds are highly variable depending on the specific silicate compound utilized. In addition, some silicates dissociate rather than melt. Thus, in some embodiments silicates may be precipitated before the discharge of effluents.

Deproteinization Procedures

Figure 3A:
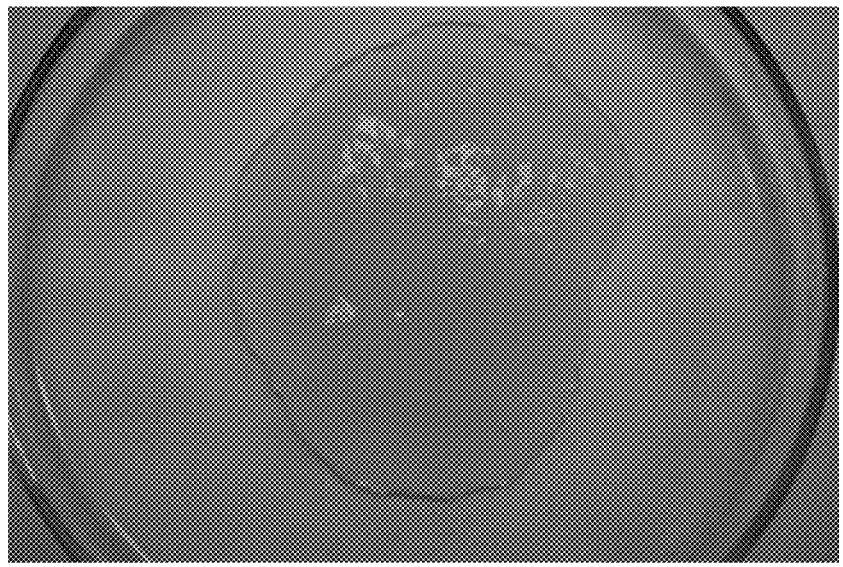
FIG. 3A shows the hydrogel obtained after extraction of the protein and oils with an alkaline solution according to embodiments of the present invention.
Figure 3B:
FIG. 3B shows the chitinous sheet after washing and drying according to embodiments of the present invention.

State-of-the-art deproteinization procedures with a strong alkali (typically NaOH solutions), produce a swollen gelatinous mass, as shown in FIG. 3A. Upon drying, the volume dramatically decreases and a thin, crispy, sheet-like material typically remains, as shown in FIG. 3B. The deproteinization procedures of the present invention use ammonium hydroxide, amines (organic derivatives of ammonia), and alkaline silicate compounds. Damp *Rhizopus oligosporus* biomass, or any other fungi, cultivated on some other suitable substrate, is mixed with each of the alkaline solutions. Prior to the alkaline treatments, the fungus may be preleached in water by heating to 80° C., filtering on a 60-mesh sieve, and then dewatering to between about 70 and 90% water. Other preleaches may also be used. Preferred embodiments of the invention include preleaching the fungal biomass with water, alcohol, hydrogen peroxide, ozone solutions, or oxidizing or reducing bleaches at temperatures between about 20° C. and 100° C. Leaching times may vary from between several hours and several days.

Exemplary Embodiment 1

In a first exemplary embodiment, ammonium hydroxide, generally at a concentration of 30% or less, may be used as the extractant at temperatures of 0-150° C. and pressures of 0-1000 kPa (0-145 psi). In some embodiments using ammonium hydroxide as the extractant, protein may be extracted and chitin may be obtained using 15% (weight/volume) aqueous ammonium hydroxide ($NH_4OH$) at 60° C. in a closed reactor to maintain adequate pressure to avoid venting off the ammonia. In other such embodiments, a 1% aqueous $NH_4OH$ solution at 60° C. may be used in a closed reactor. In this first exemplary embodiment, the method may also comprise preleaching the fungal biomass in methanol. The ammonium hydroxide may be dissociated by heating between 40° C. and 45° C. under ambient pressure, cooling the ammonia vapor, and dissolving it in water at 20° C., thereby recovering the ammonium hydroxide in a modified distillation process. The methanol may also be recovered by continued distillation at temperatures increasing to about 80° C., and condensation of the methanol vapor at temperatures below 64° C.

Exemplary Embodiment 2

In a second exemplary embodiment, ethanolamine may be used as the extractant at temperatures of 10-150° C. and concentrations of 1-100% in water or other solvent. Depending on the temperature and extractant concentration used, gauge pressures can range from 0-500 kPa (0-72 psi). In some embodiments using ethanolamine as the extractant, protein may be extracted and chitin isolated using a 50% aqueous ethanolamine solution at 80° C. In other such embodiments, a 30% ethanolamine solution may be used at 80° C. In this second exemplary embodiment, the method may also include preleaching the fungal biomass in methanol. The ethanolamine may be recovered by cooling the extract to below 10° C. to solidify the ethanolamine. The solid ethanolamine may be recovered by screening. In embodiments where the fungal biomass is preleached using methanol, the methanol may be recovered by distillation at temperatures up to and including 80° C., and recondensing the methanol vapor at temperatures below 64° C.

Exemplary Embodiment 3

Methylamine may be used as the extractant in a third exemplary embodiment of the present invention. Typical reaction conditions include temperatures of 0-100° C. and methylamine concentrations of 1-40%. The reactions may also be performed at temperatures of up to 150° C. and gauge pressures of up to 2000 kPa (290 psi), depending on the reaction temperature and the concentration of the methylamine. In some embodiments using methylamine as the extractant, protein may be extracted and chitin may be isolated using a 10% aqueous methylamine solution at 80° C. In other such embodiments, a 40% aqueous methylamine solution at 60° C. may be used in a closed reactor to prevent evaporation of the methylamine. In this third exemplary embodiment, the method may also comprise preleaching the fungal biomass in methanol. The methylamine may be recovered by distillation, while gradually increasing the temperature of the mixture from about 0° C. to about 20° C. at ambient pressure. The methylamine may be recondensed at −10° C. for reuse. The methanol used to preleach the fungal biomass may be recovered by distillation at temperatures increasing gradually to about 80° C., and recondensing the methanol vapor at temperatures below 64° C.

Exemplary Embodiment 4

Isopropylamine may be used as the extractant in a fourth exemplary embodiment of the present invention. Temperatures can range from 0-150° C. and isopropylamine concentrations can range from 1-100%. Because the boiling point of isopropylamine is around 33° C., the method comprises performing the reactions under gauge pressures of up to 2000 kPa (290 psi). In some embodiments using isopropylamine as the extractant, protein may be extracted and chitin may be isolated using a 20% aqueous isopropylamine solution at 60° C. The method may also comprise cooling the liquids to less than 33° C., and recovering the isopropylamine by distillation, while gradually increasing the temperature of the mixture to about 40-50° C., at ambient pressure, and recondensing the vapor at temperatures below 30° C. In some such embodiments, the fungal biomass may be preleached in methanol.

Exemplary Embodiment 5

In a fifth exemplary embodiment, dipropylamine may be used as the extractant using temperatures of 0-150° C. and gauge pressures of 0-500 kPa (0-72 psi). Dipropylamine is insoluble in water but can still be effective using agitation with water/dipropylamine mixtures containing 1-99% extractant, or else in pure form without the addition of water or other solvent. In some embodiments using dipropylamine as the extractant, protein may be extracted and chitin isolated using 100% dipropylamine at 80° C. In other embodiments, a 50/50 mixture of aqueous dipropylamine may be used at 60° C. In yet other embodiments, a mixture comprising 30% dipropylamine and 70% water may be used at 80° C. Dipropylamine is not miscible with water, and therefore, in such embodiments, the method may comprise continuous agitation of the dipropylamine and water. After extraction is complete, the dipropylamine may be recovered by simply drawing it off with suction or draining it by gravity after the water and dipropylamine have had sufficient time to separate.

Exemplary Embodiment 6

In a sixth exemplary embodiment, sodium orthosilicate ($Na_4SiO_4$) may be used as the extractant using concentrations of 1-90%, temperatures of 0-150° C., and gauge pressures of 0-500 kPa (0-72 psi). In some embodiments using sodium orthosilicate as the extractant, protein may be extracted and chitin isolated using a 20% aqueous sodium orthosilicate solution at 80° C. In such embodiments, the method may comprise recovering the orthosilicate from the chitin by washing with water. In some embodiments using sodium orthosilicate as the extractant, the method may comprise concentrating the orthosilicate from the wash water by either evaporating excess water, or removing by precipitation after acidification of the water to a pH of between 6 and 9 using a mineral acid. The method may also comprise reactivating the precipitated orthosilicate by adding sodium hydroxide.

Exemplary Embodiment 7

Sodium metasilicate, $Na_2SiO_3$ may be used as the extractant in a seventh exemplary embodiment of the present invention. Extractant concentrations of 1-90% may be used at temperatures ranging from 0-150° C. and gauge pressures ranging from 0-500 kPa (0-72 psi). In some embodiments using sodium metasilicate as the extractant, protein may be extracted and chitin isolated using a 20% sodium silicate pentahydrate solution at 80° C. In such embodiments, the method may also comprise recovering the metasilicate from the chitin by washing with water. The method may further comprise recovering the metasilicate from the wash water by evaporating the excess water, or removing by precipitation after acidification of the water to a pH of between 6 and 9 using a mineral acid. In some embodiments, the method may also comprise reactivating the precipitated metasilicate by adding sodium hydroxide.

Exemplary Embodiment 8

Figure 5:
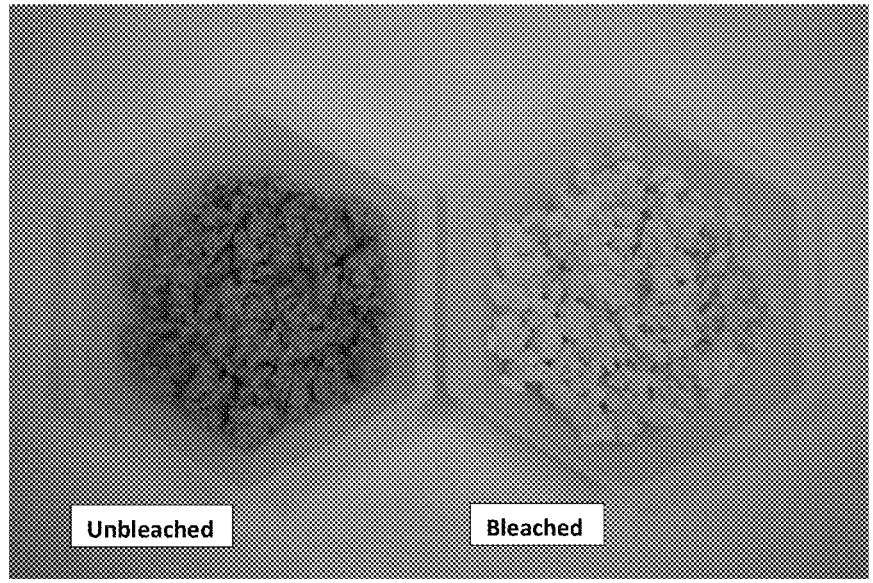
FIG. 5 shows the effect of bleaching with $H_2O_2$ and methanol on the color of the fungal biomass.
Figure 6:
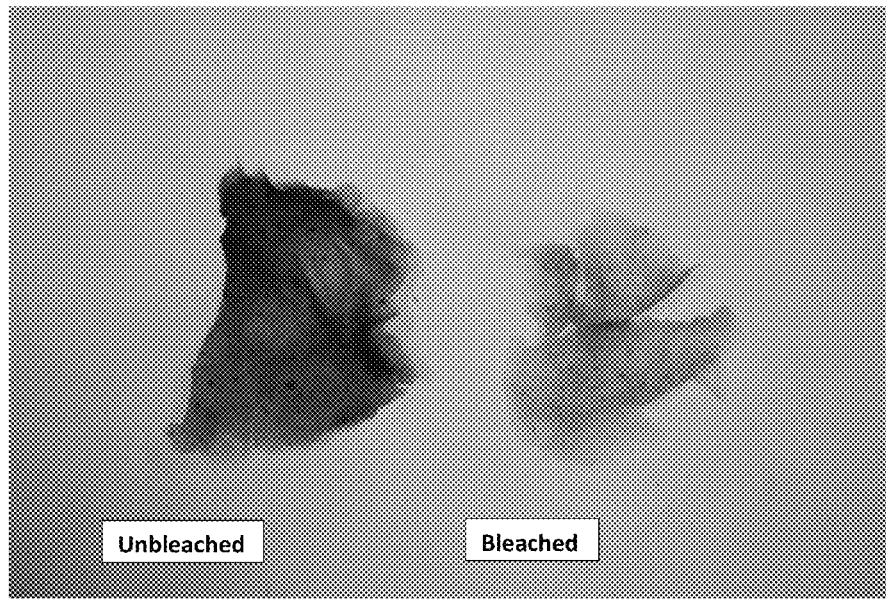
FIG. 6 shows chitin chips produced from the fungal biomass of FIG. 5 after further using 15% $NH_4OH$ at 60° C. for six hours.

The use of ammonium hydroxide ($NH_4OH$) as an extractant may produce chitin that is too dark in color if no pretreatment steps are utilized. However, the color of the chitin may be improved considerably by preleaching the fungus with 3% hydrogen peroxide ($H_2O_2$) and methanol prior to the alkaline treatment. FIG. 5 shows fungus with and without $H_2O_2$ and methanol pretreatments, while FIG. 6 shows the chitin produced using 15% $NH_4OH$ at 60° C. for six hours on each of the samples of FIG. 5. $H_2O_2$ produces chitin with better color. However, other oxidizing agents such as ozone may also be effective at removing pigments in the fungus.

Exemplary Embodiment 9

Figure 7:
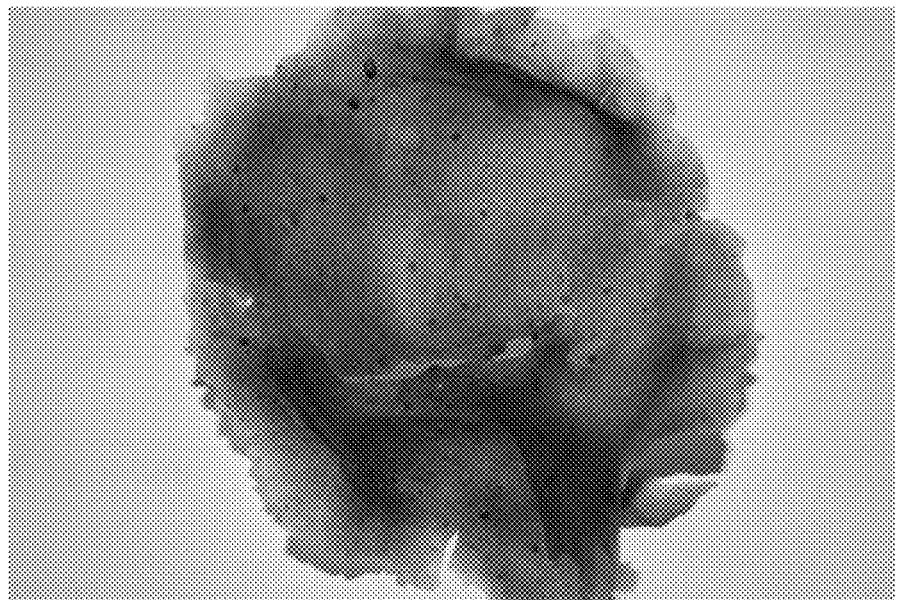
FIG. 7 shows dark specks (which are corn hila derived from fungal biomass grown on thin stillage) in a chitin chip.

Chitin products produced utilizing exemplary embodiments 1-8 above may have numerous dark specks in them. Such specks are shown in FIG. 7. The raw fungal biomass may also show the presence of dark specks. The dark specks are "hila" (singular hilum) associated with fungus cultivated on thin stillage from corn feedstock material at an ethanol plant. The color can range from a light tan to black. Ethanolamine, methylamine, dipropylamine, and sodium silicate solutions may be effective at removing hila. The hila may also be avoided by cultivating the fungi on thin stillage that has been filtered, clarified or centrifuged to remove suspended solids and/or any other color bodies.

In each of the exemplary embodiments described above, highly swelled gelatinous material may be obtained, and the methods described may comprise drying at between 50 and 100° C. the gelatinous material into thin, crispy, sheet-like material. In all of the embodiments discussed above, the resultant materials were chitin, and solutions containing protein and lipids with generally reusable extractants.

CONCLUSION/SUMMARY

Thus, the present invention provides methods for producing chitin and/or chitosan from fungal biomass, which may be used to produce high-quality, uniform, glucosamine compositions that have low concentrations of ash and are substantially free of heavy metal contaminants. The present invention also provides chitin or chitosan that may be used to produce glucosamine that is free of shellfish and shellfish allergens. Furthermore, the solvents used to extract the chitin are generally reusable, and thus, the present invention also provides methods for extracting chitin which are economical and have minimal environmental impacts.

What is claimed is:

1. A method for separating solid chitin-rich material from a fungal biomass comprising:
   a. preleaching the fungal biomass in hot water and/or an organic solvent;
   b. dissolving protein, oil and at least some carbohydrates in an extractant solution comprising an extractant mixed with water, wherein the extractant is an alkaline material comprising one or more of ammonium compounds, organic amines, and alkaline silicate compounds thereby leaving a chitin-rich material;
   c. separating solid chitin-rich material by screening or centrifugation;

d. recovering one or more alkaline extractant compounds from the extractant solution; and e. recovering protein, lipids and other fungal byproducts from the extractant solution.

2. The method of claim 1, wherein at least one of the one or more alkaline extractant compounds are recovered by one or more phase changes.

3. The method of claim 2, wherein the one or more phase changes comprise volatilization, freezing, condensation and/or dissociation.

4. The method of claim 1, wherein at least one of the one or more alkaline extractant compounds is not miscible with the water and is recovered by suction or gravity draining after the at least one alkaline extractant compound and the water separate.

5. The method of claim 1, wherein the one or more ammonium compounds comprise, ammonium formate, ammonium acetate, ammonium carbonate, ammonium bicarbonate, ammonium carbamate, ammonium citrate, ammonium lactate, ammonium oxalate, and/or ammonium succinate, and the one or more ammonium compounds are dissolved in the water.

6. The method of claim 5, wherein the one or more ammonium compounds are recovered at least partially by distilling off ammonia and the water at a temperature between 30° C. and 100° C., and subsequently condensing ammonium hydroxide at a temperature ranging from 0° to 20° C.

7. The method of claim 1, wherein at least one of the one or more alkaline extractant compounds is a primary, secondary, tertiary, and/or cyclic amine in the water.

8. The method of claim 1, wherein the organic amines comprise ethanolamine, methylamine, isopropylamine, dipropylamine, or any combination thereof.

9. The method of claim 1, wherein an organic solvent is added to the extractant solution before the chitin-rich material is separated.

10. The method of claim 9, wherein the organic solvent comprises one or more alcohols, alkanes, alkenes, carboxylic acids, esters, and/or ethers.

11. A method for separating chitin form fungal biomass, comprising:
 a) preleaching the fungal biomass in hot water and/or an organic solvent to extract oil and/or a portion of carbohydrates;
 b) dissolving protein and at least some carbohydrates in an extractant comprising one or more of ammonium compounds, organic amines, and alkaline silicate compounds mixed with water, thereby leaving a chitin-rich material;
 c) separating the solid chitin by screening or centrifugation;
 d) recovering the extractant;
 e) recovering the protein, at least some of the carbohydrates, lipids and other fungal byproducts from the extractant.

12. The method of claim 11, wherein the fungal biomass is pretreated with one or more oxidizing solutions.

13. The method of claim 12, wherein one of the one or more oxidizing solutions is hydrogen peroxide.

14. The method of claim 12, wherein one of the one or more oxidizing solutions is dissolved ozone.

15. The method of claim 11, wherein the fungal biomass is pretreated with one or more bleaches.

16. The method of claim 1, wherein the protein, oil and at least some carbohydrates are dissolved at a temperature between 0° C. and 100° C., and at atmospheric pressure.

17. The method of claim 1, wherein the extractant solution further comprises one or more organic solvents and the protein, oil and at least some carbohydrates are dissolved at a temperature between 0° C. and 100° C. and a gauge pressure ranging from 0-2000 kPa (0-290 psi).

18. The method of claim 1, wherein the protein, oil and the at least some carbohydrates are dissolved at a temperature between 100° C. and 150° C., and under a pressure sufficient to raise the boiling point of the extractant solution to at least 100° C.

19. The method of claim 1, wherein the protein, oil and the at least some carbohydrates are dissolved in one or more ammonium compounds, and the method further comprises decomposing the one or more ammonium compounds by heating, evaporating, and condensing the compounds, and then reacting the decomposed compounds at a lower temperature to recover the ammonium compound.

20. The method of claim 1, wherein the one or more alkaline silicate compounds comprise organic and/or inorganic silicate compounds.

21. The method of claim 20, wherein the one or more silicate compounds comprise sodium silicate and/or potassium silicate.

22. The method of claim 1, wherein the protein, oil and at least some carbohydrates are dissolved in one or more aqueous alkaline silicate compounds, and the method further comprises removing the alkaline silicate compounds by washing the chitin with water, precipitating the silicate compounds from the wash water by acidifying the solution to a pH of between 6 and 9, and reactivating the precipitated silicates with sodium hydroxide.

23. The method of claim 1, wherein at least one of the one or more alkaline extractant compounds has a freezing point higher than the freezing point of water, and the method further comprises recovering the at least one alkaline extractant compound by freezing and screening out the frozen solids.

24. The method of claim 1, wherein at least one of the one or more alkaline extractant compounds is not miscible with the water, and the method further comprises separating the at least one alkaline extractant compound by centrifugation or membrane separation.

25. The method of claim 11, wherein the fungal biomass is preleached in water and an organic solvent, and wherein the organic solvent comprises one or more alcohols, alkanes, alkenes, carboxylic acids, esters, and/or ethers.

* * * * *